United States Patent
Beyl (12)

(10) Patent No.: US 6,405,614 B1
(45) Date of Patent: Jun. 18, 2002

(54) BICYCLE PEDAL WITH SECURE FIXING ELEMENT, AND DEVICE FOR FIXING A SHOE ON THE PEDAL

(75) Inventor: Suzanne H. Beyl, Nevers (FR)

(73) Assignee: Time Sport International, Varennes-Vauzelles (FR)

( * ) Notice: Subject to any disclaimer, the term of this patent is extended or adjusted under 35 U.S.C. 154(b) by 0 days.

(21) Appl. No.: 09/508,626

(22) PCT Filed: Sep. 8, 1998

(86) PCT No.: PCT/FR98/01915
§ 371 (c)(1),
(2), (4) Date: Jun. 2, 2000

(87) PCT Pub. No.: WO99/14107
PCT Pub. Date: Mar. 25, 1999

(30) Foreign Application Priority Data

Sep. 18, 1997 (FR) .............................. 97 11620

(51) Int. Cl.[7] .................................. G05G 1/14
(52) U.S. Cl. ................... 74/594.6; 74/594.4
(58) Field of Search ................ 74/594.6, 594.4

(56) References Cited

U.S. PATENT DOCUMENTS

| 4,762,019 A | 8/1988 | Beyl ................. 74/594.6 |
| 4,882,946 A | 11/1989 | Beyl ................. 74/594.6 |
| 5,131,291 A | 7/1992 | Beyl ................. 74/594.6 |
| 5,417,128 A | 5/1995 | Beyl ................. 74/594.6 |

FOREIGN PATENT DOCUMENTS

| DE | 3832067 | 3/1990 | ............ 74/594.6 |
| EP | 98329 | 1/1984 | ............ 74/594.6 |
| EP | 0 572 291 A1 | 12/1993 | |
| EP | 0 576 042 A2 | 12/1993 | |
| FR | 2 518 041 | 12/1982 | |
| FR | 2 574 743 | 6/1986 | |
| FR | 2 638 700 | 5/1990 | |
| FR | 2 699 492 | 6/1994 | |

*Primary Examiner*—David A. Bucci
*Assistant Examiner*—Vicky A Johnson
(74) *Attorney, Agent, or Firm*—Pillsbury Winthrop LLP

(57) ABSTRACT

A bicycle pedal with safety fixing for a shoe equipped beneath the sole with a cleat includes a retaining device able to cooperate with the catch so as to ensure retention of the cleat and of the shoe upward and forward, and a holding member that is situated at the rear of the pedal and mounted movably along the longitudinal direction, and is able to be applied by a first elastic return device against the rear of the cleat so as to thrust it against the retaining device and ensure fastening. The retaining device is mounted in such a way as to be able to be displaced forward, countering a second elastic return device, in particular under the action of a thrust exerted by the cleat, and to return to the position of fastening of a catch of the cleat under the action of the second elastic return device.

11 Claims, 2 Drawing Sheets

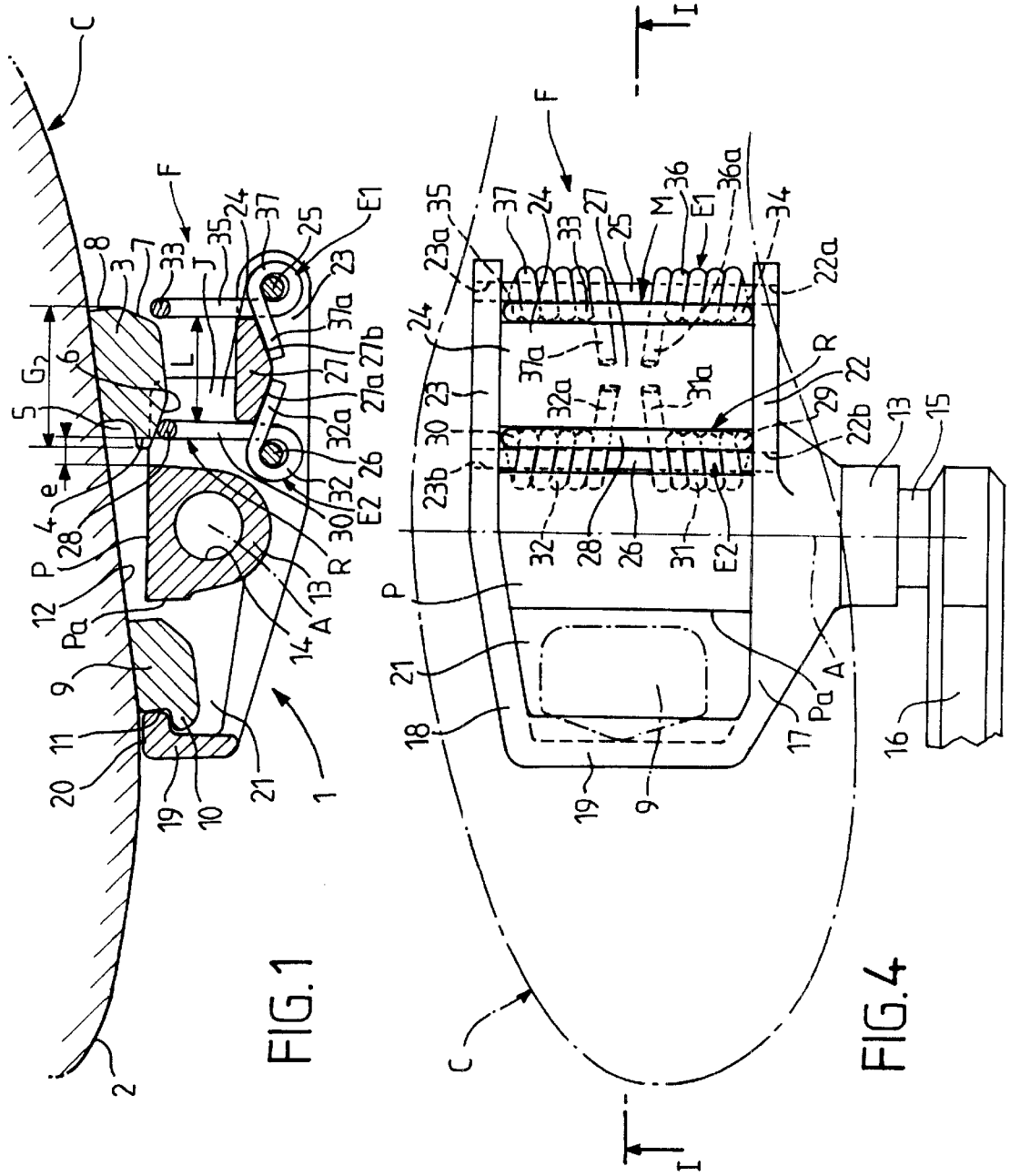

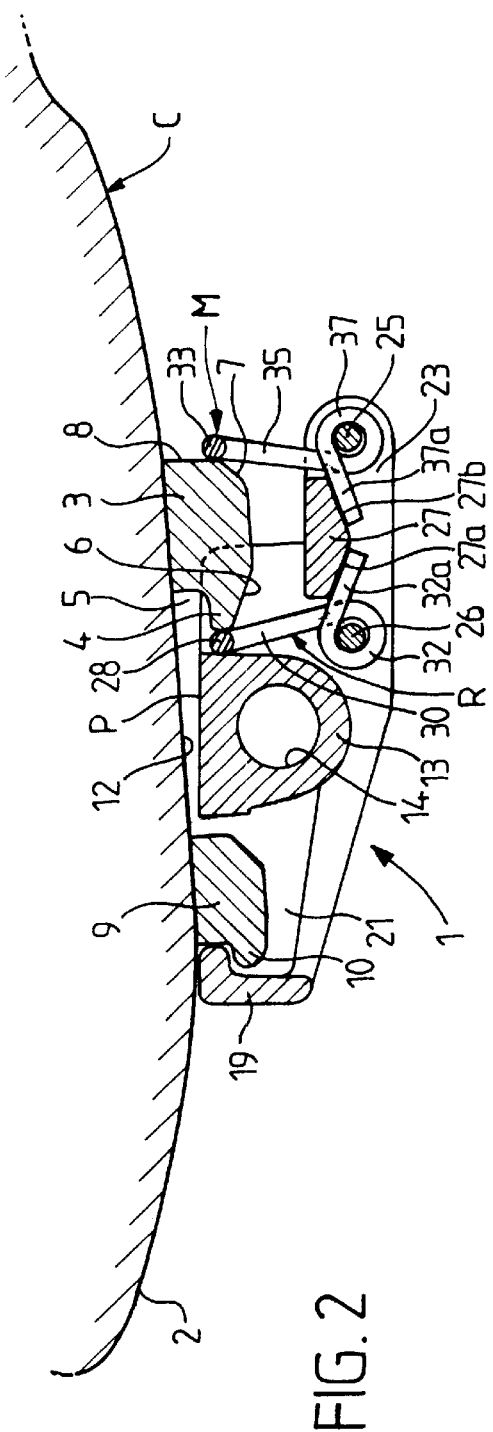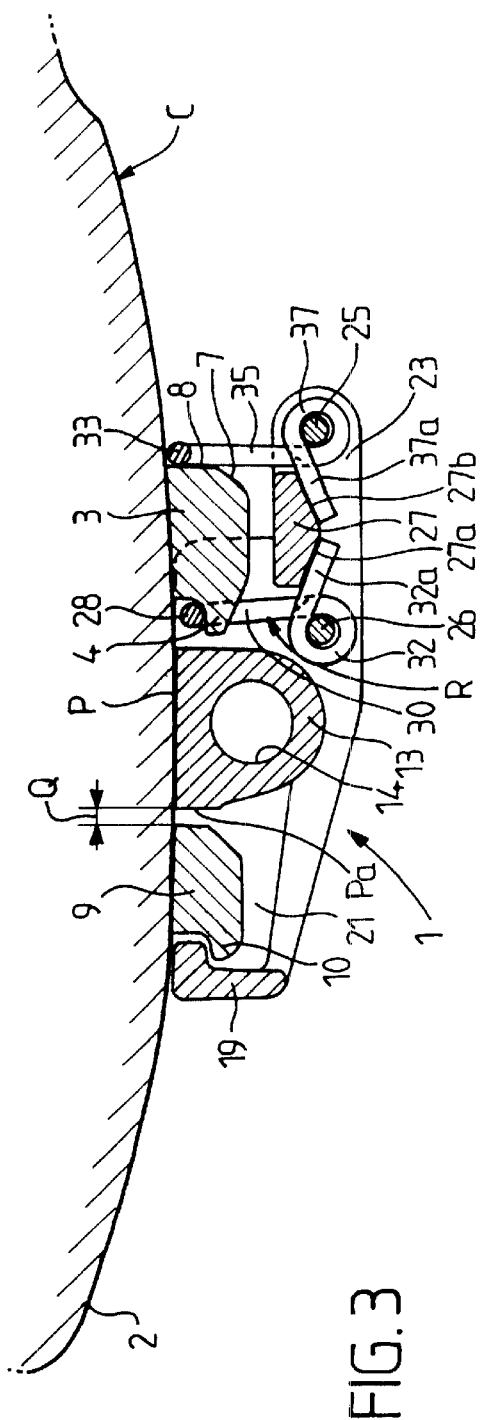

BICYCLE PEDAL WITH SECURE FIXING ELEMENT, AND DEVICE FOR FIXING A SHOE ON THE PEDAL

This application is the national phase of international application PCT/FR98/01915 filed Sep. 8, 1998, which designated the U.S.

BACKGROUND OF THE INVENTION

1. Field of the Invention

The invention relates to a bicycle pedal with safety fixing for a shoe equipped beneath the sole with a cleat furnished with a catch directed forward, the pedal being mounted rotatably about an axis.

2. Description of the Related Art

The invention relates to a bicycle pedal with safety fixing for a shoe equipped beneath the sole with a cleat furnished with a catch directed forward, the pedal being mounted rotatably about an axis.

The pedal relevant to the invention is of the kind of those which comprise:

- a retaining means running transversely at the rear of the axis of rotation of the pedal, this retaining means being situated in front of an opening in which the cleat of the shoe can engage, and being able to cooperate with the catch of the cleat so as to ensure retention of the cleat and of the shoe upward and forward; and
- a holding member, situated at the rear of the pedal and mounted movably along the longitudinal direction, able to be applied by elastic return means against the rear of the cleat so as to thrust it against the retaining means and ensure fastening.

A pedal of this type is known, in particular from FR-B-2 564 414, FR-B-2 574 743 and EP-B-0 169 080. FR-B-2 564 414 and EP-B-0 169 080 correspond to U.S. Pat. No. 4,762,019, and FR-B-2 574 743 corresponds to U.S. Pat. Nos. 4,882,946 and 4,762,019.

Such a pedal increases the safety of the cyclist by allowing fast release of the shoe, especially to prevent a fall, by a twisting movement of the foot. Among other advantages, it should be stressed that the sole of the shoe bears directly on the pedal, a small distance from the geometrical axis of rotation, without being separated therefrom by the cleat which becomes housed in an opening situated to the rear of the bearing zone; the efficiency of pedaling is thereby improved.

Although this fixing device operates in an entirely satisfactory manner, "shoe attachment", that is to say the fastening of the cleat and of the shoe to the pedal, is not as easy as desired.

The objective of the invention is, above all, to provide a bicycle pedal with safety fixing of the kind in question which, whilst preserving the advantages recalled hereinabove, allows easier and faster "shoe attachment", in the sense defined earlier. It is also desirable for the pedal to be of simple, reliable and robust construction.

SUMMARY OF THE INVENTION

According to the invention, a bicycle pedal with safety fixing, of the kind defined earlier, is characterized in that the retaining means provided on the pedal is mounted in such a way as to be able to be displaced forward, countering elastic return means, in particular under the action of a thrust exerted by the cleat, and to return to the position of fastening of the catch under the action of the elastic return means.

Preferably, the retaining means consists of a pin parallel to the geometrical axis of the pedal and displaceable parallel to itself.

Advantageously, the pin is supported by two radially oriented arms, capable of pivoting about an axis parallel to the geometrical axis of rotation of the pedal, the assembly of the pin and of the arms being subjected to the action of at least one torsion spring.

The pin and the arms may form a single piece bent into a U, made in particular of steel wire, those ends of the arms which are remote from the pin being wound into a helix, oppositely directed, on each side so as to form a torsion spring. The windings of the torsion springs are substantially coaxial, parallel to the axis of rotation of the pedal, and a rod is threaded into these windings so as to serve as a support for the springs and for the pin, this rod being engaged in holes provided on each side respectively of the pedal.

Advantageously, the holding member and the retaining means have a substantially symmetric geometrical configuration with respect to a plane parallel to the axis of rotation of the pedal and perpendicular to the midplane of this pedal. The holding member is likewise formed by a pin with arms, constituting a single piece bent into a U, those ends of the arms remote from the pin being wound into a helix, in the reverse direction to the substantially symmetric windings of the retaining means.

The torsion springs of the retaining means tend to hold it separated from the rear edge of a plate of the pedal covering the axis of rotation, while the torsion springs of the holding member return the holding pin toward this rear edge of the plate of the pedal.

The two parallel pins define therebetween a window whose width can firstly increase, under a substantially vertical thrust of the cleat furnished with inclined edges bearing against the pins, so as to allow the passage of the cleat and of its catch, then thereafter decrease with fastening of the cleat catch by recoil of the pin forming retaining means.

Preferably, those ends of the torsion springs remote from the arms are extended by a radial extension coming into abutment beneath a crossbar provided at the rear bottom part of the pedal.

Advantageously, one and the same crossbar with two inclined opposite lower edges, serves as a stop for the radial extensions of the arms of the retaining means and of the holding member.

The invention also relates to a device for fixing a shoe to a bicycle pedal as defined above, formed by the combination of the pedal and of at least one main cleat able to be fixed beneath the sole of a shoe and to cooperate with the retaining means and the holding member of the pedal.

The invention consists, apart from the arrangements set forth hereinabove, of a certain number of other arrangements which will be dealt with more explicitly hereinbelow with regard to a particular exemplary embodiment described with reference to the appended drawings, but which is in no way limiting.

BRIEF DESCRIPTION OF THE DRAWINGS

FIG. 1, of these drawings, is a longitudinal schematic section through a pedal in accordance with the invention, and through a shoe sole with a main cleat for fastening to the pedal and supplementary cleat, at the start of the shoe attachment operation.

FIG. 2 shows, in a similar way to FIG. 1, the pedal and the shoe sole in the course of shoe attachment, the catch of the cleat being in the process of negotiating the retaining means.

FIG. 3 shows, in a similar way to FIG. 1, the pedal and the shoe sole in the shoe-attached position.

FIG. 4, finally, is a plan view of the pedal according to the invention.

Referring to the drawings, in particular to FIGS. 1 and 4, there is depicted a bicycle pedal 1, mounted rotatably about a geometrical axis A, with safety device F for fixing a shoe C to this pedal 1.

The expression "transverse direction" will designate a direction parallel to the axis A; the expression "longitudinal direction" a direction orthogonal to the axis A and parallel to the midplane of the pedal. The "front" of the pedal designates the part closest to the toe of a shoe fixed to this pedal. The "rear" of the pedal designates the other extreme, part of the pedal.

Only the sole 2 of the shoe C is represented schematically, with a main cleat 3 secured to the sole 2. The cleat 3 can be made from metal or plastic; it is fixed to the sole C in a removable manner by screws (not represented), with a possibility of adjustment at least in the longitudinal direction.

The cleat 3 is situated at the rear of the part of the sole corresponding to the largest width of the foot. The cleat 3 is furnished with a catch 4 directed forward, and separated from the lower surface of the sole 2 in such a way as to determine a housing 5 open toward the front. The lower surface 6 of the catch 4 is inclined from top to bottom from the front to the rear. The rear face of the cleat 3 comprises, in the bottom art, a surface 7 inclined in the opposite direction to the surface 6, and in the top part a surface 8 substantially orthogonal to the zone adjacent to the sole 2.

A supplementary cleat 9, of smaller dimensions, is provided in front of the cleat 3 and is fixed to the sole 2 in a removable manner adjustable by screws (not represented). The supplementary cleat 9 likewise comprises a forward projecting catch 10 defining, with the sole 2, a housing 11 open toward the front.

The space 12 of the sole 2 included between the two cleats 3 and 9 is able to bear directly on a pedal plate P situated in line with the axis of rotation. The articulation of the metatarsus of the user's foot is located in the zone of the space 12 of the sole.

The pedal 1 is composed of a hub 13 comprising a bore 14 in which is engaged an axle 15 (FIG. 4) fixed to the crank 16 and on which the pedal 1 is mounted free to rotate.

When the pedal 1 is horizontal, as illustrated in FIGS. 1 and 4, the upper surface of the hub 13, formed by the plate P, is itself horizontal. The dimension of the plate P is smaller in the longitudinal direction of the pedal.

The front transverse edge Pa of the plate P is secured, respectively at each of its ends, to two branches 17, 18 projecting forward and connected together by a front transverse edge 19. This edge 19 has been represented straight, but it may have a different shape, in particular forwardly convex. The upper part of the edge 19 has a rearward turnback 20, able to engage in the housing 11 defined by the supplementary cleat 9. An opening 21 of substantially trapezoidal shape is delimited by the two branches 17, 18, the front edge of the plate P and the transverse edge 19. The supplementary cleat 9 will engage in this opening 21.

The plate P is situated substantially in the same plane as the upper part of the edge 19.

The hub 13 is extended rearward, at each transverse end of the plate P, by a longitudinal branch 22, 23. An opening 24 is thus delimited by the branches 22, 23, at the rear of the plate P, so as to receive the cleat 3.

The branches 22, 23 run at the lower level of the hub 13. A lateral cheek J is provided on each longitudinal side of the pedal so as to strengthen the join between the branches 22, 23 and the hub 13.

The branches 22, 23 comprise, toward their rear end, a hole 22a, 23a serving as a bearing to receive the ends of a rod 25.

The branches 22 and 23 likewise comprise, in proximity to the rear face of the hub 13, a hole 22b, 23b to serve as a bearing for a second transverse rod 26 parallel to the geometrical axis A of rotation of the pedal.

The branches 22, 23 are connected in a zone lying between the holes 22a, 22b and 23a, 23b, by a crossbar 27 whose lower surface has a cross section in the shape of an open V, as visible in FIG. 1. The lower face 27a, pointing forward, is inclined from top to bottom rearward, while the rear face 27b is inclined in the opposite direction.

The pedal 1 comprises a retaining means R running transversely at the rear of the geometrical axis A. This retaining means R is situated in front of the opening 24 and is able to cooperate with the catch 4 of the cleat 3 so as to retain the shoe C forward and upward.

The pedal 1 likewise comprises a holding member M mounted movably in the longitudinal direction and able to be applied by elastic return means E1 against the surface 8 of the cleat 3 so as to thrust it against the retaining means R and ensure cleat/pedal fastening.

The retaining means R is mounted on the pedal 1 in such a way as to be able to be displaced longitudinally forward, countering elastic return means E2.

The retaining means R advantageously consists of a pin 28 parallel to the geometrical axis A of the pedal and displaceable parallel to itself.

The pin 28 is supported by two radially oriented pivoting arms 29, 30 secured to the ends of the pin 28.

Advantageously, the pin 28 and the arms 29, 30 form a single piece made of steel wire bent into a U, the arms 29, 30 constituting the parallel branches of the U while the pin 28 corresponds to the elongate base of this U.

Those ends of the arms 29, 30 remote from the pin are wound into a helix, in the opposite direction, so as to form, on each side, a torsion spring 31, 32 whose turns are directed toward the interior of the U. The springs 31, 32 are coaxial and respectively form two sleeves into which is engaged the rod 26 whose ends are carried by the branches 22, 23.

Those ends of the torsion springs 31, 32 remote from the arms 29, 30 are extended by a radial extension 31a, 32a coming into abutment beneath the face 27a of the crossbar 27.

The springs 31, 32 are provided so as to effect a clockwise return of the pin 28 according to FIG. 1 and so as to elastically oppose a forward displacement (that is to say one toward the left of FIG. 1) of the pin 28.

The rest position of the retaining member R is illustrated in FIG. 1. When the pedal 1 is horizontal, the arms 29, 30 in the rest position are substantially vertical and the pin 28 is separated by a distance e from the rear edge of the plate P.

The holding member M likewise consists of a single piece made of steel wire bent into a U comprising a pin 33, parallel to the pin 28 and situated at the rear of the latter. This pin 33 is secured, at each of its ends, to radial arms 34, 35 extending, at their ends remote from the pin 39, via windings 36, 37 forming a torsion spring. Each winding 36, 37, at its end remote from the arms 34, 35, extends via a radial extension 36a, 37a which abuts at a stop beneath the face 27b of the crossbar 27. The windings 36, 37 are mutually oppositely directed. The winding 36 is furthermore directed oppositely with respect to the winding 31 situated on the same side. The same is true for the windings 37 and 32. Thus, the means E1 formed by the windings 36 and 37 elastically return the pin 33 anticlockwise, according to FIG. 1. In the rest position, illustrated in this FIG. 1, the arms 34, 35 are substantially vertical when the pedal is horizontal.

The geometrical configuration of the pin 33, of the arms 34, 35 and of the windings 36, 37 is substantially symmetric with that of the pin 28, of the arms 29, 30 and of the springs 31, 32, with respect to the transverse mediator plane of the crossbar 27.

The distance L between the interior edges of the pins 32, 33 at rest is less than the distance G between the front end of the catch 4 and the surface 8 of the cleat 3.

The rod 25, supported at its ends by the branches 22 and 23, passes through the two coaxial windings 36, 37.

This being so, the manner of operation of the pedal with safety fixing according to the invention, in particular as regards "shoe attachment", is as follows.

With a view to shoe attachment, the cyclist places his shoe C in the position illustrated in FIG. 1, by engaging the supplementary cleat 9 in the opening 21, thereby positioning the inclined lower surface 6, of the cleat 3, above the pin 28.

The supplementary cleat 9 abuts against the turnback 20 of the front edge of the pedal, which constitutes a bearing point for the shoe attachment operation.

The cyclist exerts a downward directed thrust on the cleat 3.

The lower surface 6 exerts a pressure on the pin 28 which moves forward, countering the action of the springs 31, 32, as illustrated in FIG. 2. The rear surface 7 of the cleat 3 acts in the opposite direction against the pin 33.

The distance between the pins 28 and 33 increases sufficiently to allow downward passage of the catch 4 of the cleat.

As soon as the catch 4 has passed downward beyond the pin 28, the latter, returned clockwise by the springs 31, 32, recoils and will engage in the housing 5 (FIG. 3). Simultaneously, the pin 33 comes to bear against the rear surface 8 of the cleat 3.

The shoe C is then fastened to the pedal 1 and is retained by the pin 28 toward the top and toward the front.

The "shoe attachment" operation is greatly eased by this possibility of dislodgment of the retaining pin 28. The resistance exerted by the springs 31, 32 can be adjusted initially to the most suitable value.

The engaging of the pin 28 in the housing 5 takes place by itself, without the shoe C having to perform a recoil movement, opposite to the direction of thrust of the foot, followed by a forward movement.

The windings 36, 37 acting on the pin 33 are scarcely urged during shoe attachment, which essentially involves the pin 28. It is therefore possible to provide less flexible windings 36, 37 with a smaller number of turns.

Shoe detachment, that is to say the separating of the shoe C relative to the pedal 1, is performed via a simple twisting movement of the cyclist's foot relative to the pedal, in the direction which separates the heel from the bicycle. This twisting movement causes the separation of the pins 28 and 33 and the releasing of the cleat 3 which acts in the manner of a cam via its front and rear faces.

Although the description has focused essentially on a retaining means formed by a pin 28 supported by pivoting arms, it is clear that the retaining means could consist of a pin or a sliding strip in a plane parallel to the plate P and returned elastically, or of any other equivalent means.

What is claimed is:

1. A bicycle pedal with safety fixing for a shoe equipped beneath a sole with a cleat furnished with a catch directed forward, the pedal mounted rotatably about an axis comprising:

a retaining means running transversely of the pedal and on a side of the axis of rotation of the pedal, this retaining means being situated in front of an opening in which the cleat of the shoe can engage, and being able to cooperate with the catch of the cleat so as to ensure retention of the cleat and of the shoe upward and forward; and a holding member, situated on the pedal on the side of the axis of rotation of the pedal and mounted movably along a longitudinal direction, able to be applied by a first elastic return means against a rear of the cleat so as to thrust it against the retaining means and ensure fastening, wherein the retaining means provided on the pedal is mounted in such a way as to be able to be displaced forward, countering a second elastic return means, in particular under an action of a thrust exerted by the cleat, and to return to a position of fastening of the catch under the action of the second elastic return means.

2. A bicycle pedal according to claim 1, wherein the retaining means consists of a first pin parallel to the axis of the pedal and displaceable parallel to the axis.

3. A bicycle pedal according to claim 2, wherein the first pin is supported by two radially oriented arms, capable of pivoting about an axis parallel to the axis of rotation of the pedal, the assembly of the first pin and of the arms being subjected to action of the second elastic return means.

4. A bicycle pedal according to claim 2 or 3, wherein the first pin forms together with arms of the first pin a single piece bent into a U, made of steel wire, ends of the arms of the first pin which are remote from the first pin being wound into a first helix, oppositely directed, on each side so as to form the second elastic return means.

5. A bicycle pedal according to claim 4, wherein windings of the second elastic return means are substantially coaxial, parallel to the axis of rotation of the pedal, and a rod is threaded into these windings so as to serve as a support for the second elastic return means and for the first pin, this rod being engaged in holes provided on each side respectively of the pedal.

6. A bicycle pedal according to claim 4, wherein the holding member and the retaining means have a substantially symmetric geometrical configuration with respect to a plane parallel to the axis of rotation of the pedal and perpendicular to a midplane of the pedal.

7. A bicycle pedal according to claim 6, wherein the holding member is formed by a second pin with arms, constituting a single piece bent into a U, ends of the arms of the second pin remote from the second pin being wound into a second helix, in a reverse direction to substantially symmetric windings of the retaining means.

8. A bicycle pedal according to claim 7, wherein the first and second pins define therebetween a window whose width can firstly increase, under a substantially vertical thrust of the cleat furnished with inclined edges bearing against the pins, so as to allow the passage of the cleat and of its catch, then thereafter decrease with fastening of the cleat catch by recoil of the first pin forming the retaining means.

9. A bicycle pedal according to claim 7, wherein ends of the first and second elastic return means remote from the arms are extended by a radial extension coming into abutment beneath a crossbar provided at a bottom part of the pedal, the crossbar having inclined opposite lower edges.

10. Device for fixing a shoe to a bicycle pedal according one of claims 1, 2, or 3, wherein the device is formed by the combination of the pedal and of at least one main cleat able to be fixed beneath the sole of the shoe and to cooperate with the retaining means and the holding member of the pedal.

11. A bicycle pedal according to claim 5, wherein the holding member and the retaining means have a substantially symmetric geometrical configuration with respect to a plane parallel to the axis of rotation of the pedal and perpendicular to a midplane of the pedal.

* * * * *